J. DEMPSTER.
DOUGH MOLDING MACHINE.
APPLICATION FILED DEC. 10, 1906.

907,322.

Patented Dec. 22, 1908.

WITNESSES,

INVENTOR,
J. Dempster,
By Fred B. Fetherstonhaugh
atty.

UNITED STATES PATENT OFFICE.

JAMES DEMPSTER, OF TORONTO, ONTARIO, CANADA.

DOUGH-MOLDING MACHINE.

No. 907,322.  Specification of Letters Patent.  Patented Dec. 22, 1908.

Application filed December 10, 1906. Serial No. 347,228.

*To all whom it may concern:*

Be it known that I, JAMES DEMPSTER, of the city of Toronto, in the county of York, in the Province of Ontario, Canada, baker, have invented certain new and useful Improvements in Dough-Molding Machines, of which the following is the specification.

My invention relates to improvements in dough molding machines and the object of the invention is to devise a machine of this class, which will work or knead the loaves or dough following closely the action of the baker's hand on a small piece of dough on a table, so that a large substantially spherical or bun-shape loaf may be produced properly rolled up and it consists essentially of a disk secured on the end of a suitable shaft, a frame carrying journal bearings for the shaft, a hopper located in front of the disk and of a substantially helical form with the feed entrance at the outer end of the helix and the discharge in the center thereof, and the parts being otherwise constructed and arranged in detail as hereinafter more particularly explained.

Figure 1:
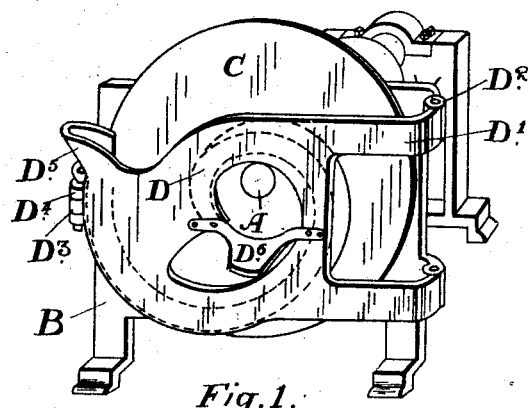
Figure 2:
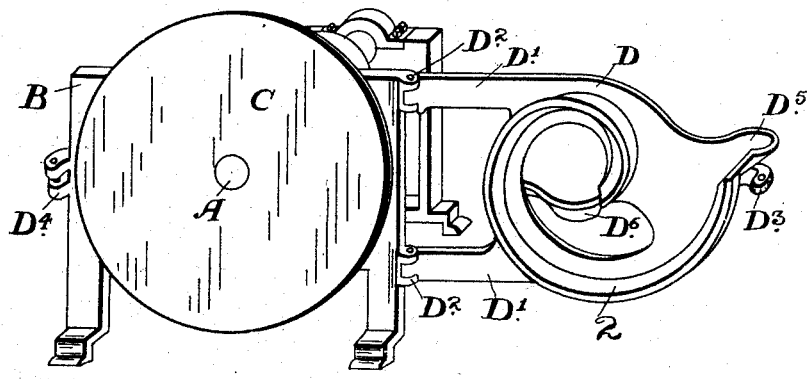
Figure 3:
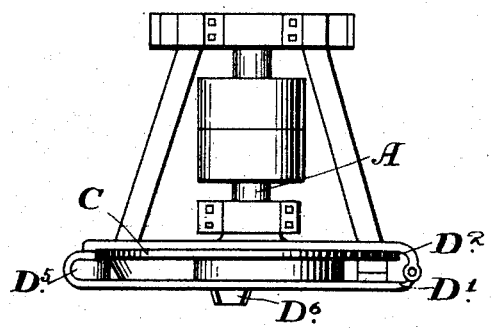

Figure 1, is a perspective view of my dough rolling up machine. Fig. 2 is a view showing the hopper swung open clear of the disk. Fig. 3 is a plan view.

In the drawings like letters of reference indicate corresponding parts in each figure.

A is the main shaft and B the frame of the machine in which said shaft is journaled and C is a disk secured at one end of the shaft.

D is a hopper having the end bars $D'$, which are hinged between lugs $D^2$ on the frame. The hopper D is provided with a suitable fastening lug $D^3$ through which and lugs $D^4$ a pin extends to secure the hopper in position.

It will be noticed from the drawing as indicated in dotted lines in Fig. 1 and full lines in Fig. 2, that the hopper is of a helical form with an entrance lip $D^5$, a helical lip 2 and an exit chute $D^6$ located opposite the center of the helix and beneath the orifice in and secured to the front plate of the hopper.

The dough is fed in onto the lip $D^5$ and passes against the surface of the disk, which in rotating carries it around giving it very much the same action as the hand in rolling up the dough and disk frictionally acting against the dough and the helical form of the hopper serving at the same time to draw the dough into a bun or spherical-like form as it approaches the center of the helix through which it is discharged over the chute or lip $D^6$ on to any suitable receptacle or endless carrier.

In action to understand the peculiar principle of my machine it may be stated that the dough is twisted and pushed by the combined action of the disk and hopper and discharged in the form of a loaf rolled up into spherical form.

Although I have described my machine with a disk disposed vertically it will, of course, be understood that the disk may be utilized horizontally without departing from the spirit of my invention.

To clean the disk wheel, the hopper may be readily swung out into the position shown in Fig. 2.

What I claim as my invention is.

The combination with a disk secured on a suitable shaft and suitably journaled, of a hopper comprising the front plate having a substantially helical rib in proximity to the disk provided with a substantially central discharge orifice, the said hopper being hinged at one side, whereby it may be opened as and for the purpose specified.

JAMES DEMPSTER.

Witnesses:
 B. BOYD,
 A. CRIGHTON.